United States Patent
Zhang et al.

(10) Patent No.: US 9,042,312 B2
(45) Date of Patent: May 26, 2015

(54) HETEROGENEOUS NETWORK PARTITION IN TDD BEYOND RADIO FRAME

(75) Inventors: Xiaoxia Zhang, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 832 days.

(21) Appl. No.: 13/073,491

(22) Filed: Mar. 28, 2011

(65) Prior Publication Data

US 2011/0255489 A1 Oct. 20, 2011

Related U.S. Application Data

(60) Provisional application No. 61/325,193, filed on Apr. 16, 2010.

(51) Int. Cl.
*H04W 28/26* (2009.01)
*H04L 1/18* (2006.01)

(52) U.S. Cl.
CPC ............. *H04L 1/1822* (2013.01); *H04L 1/1812* (2013.01); *H04L 1/1864* (2013.01); *H04L 1/1887* (2013.01); *H04L 1/1893* (2013.01); *H04L 1/1896* (2013.01)

(58) Field of Classification Search
USPC .................................. 370/329, 341, 348, 322
See application file for complete search history.

(56) References Cited

U.S. PATENT DOCUMENTS

| | | | |
|---|---|---|---|
| 2009/0217118 A1 | 8/2009 | Miki et al. | |
| 2010/0202349 A1* | 8/2010 | Guan | 370/328 |
| 2010/0235705 A1* | 9/2010 | Kim et al. | 714/749 |
| 2012/0120854 A1* | 5/2012 | Zhang et al. | 370/280 |
| 2012/0170504 A1* | 7/2012 | Hoymann et al. | 370/312 |

FOREIGN PATENT DOCUMENTS

| | | |
|---|---|---|
| CN | 101068182 A | 11/2007 |
| CN | 101416554 A | 4/2009 |
| EP | 1983702 A1 * | 10/2008 |
| EP | 1983782 A1 | 10/2008 |
| JP | 2007214823 A | 8/2007 |
| KR | 100913094 B1 | 8/2009 |
| WO | 2008041824 A2 | 4/2008 |
| WO | 2008084961 A2 | 7/2008 |
| WO | WO-2008151537 A1 | 12/2008 |
| WO | 2009128672 A1 | 10/2009 |

OTHER PUBLICATIONS

International Search Report and Written Opinion—PCT/US2011/030386—ISA/EPO—Jun. 7, 2011.

* cited by examiner

*Primary Examiner* — Dang Ton
*Assistant Examiner* — Pamit Kaur
(74) *Attorney, Agent, or Firm* — Dalei Dong

(57) ABSTRACT

Maintaining uplink hybrid automatic repeat request (HARQ) compatibility with extended radio frames includes partitioning subframe groups over an extended radio frame having a length of time greater than a time defined for a single radio frame. User equipment (UE) suspends PUSCH (physical uplink shared channel) retransmission in the extended radio frame, in accordance with hybrid automatic repeat request (HARQ) timing of a subframe group assigned to the UE.

26 Claims, 8 Drawing Sheets

HETEROGENEOUS NETWORK PARTITION IN TDD BEYOND RADIO FRAME

CROSS-REFERENCE TO RELATED APPLICATIONS

This application claims the benefit under 35 U.S.C. §119(e) to U.S. Provisional Patent Application Ser. No. 61/325,193 entitled SYSTEMS AND METHODS FOR MAINTAINING UPLINK HYBRID AUTOMATIC REPEAT REQUEST (HARQ) COMPATIBILITY WITH EXTENDED RADIO FRAMES, filed on Apr. 16, 2010, the disclosure of which is expressly incorporated by reference herein in its entirety.

BACKGROUND

1. Field

Aspects of the present disclosure relate generally to wireless communication systems, and more particularly to maintaining uplink hybrid automatic repeat request (HARQ) compatibility with extended radio frames.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect, a method of wireless communication is disclosed. The method includes partitioning subframe groups over an extended radio frame. The extended radio frame has a length of time greater than a time defined for a single radio frame. User equipment suspends PUSCH (physical uplink shared channel) retransmission in the extended radio frame, in accordance with hybrid automatic repeat request (HARQ) timing of a subframe group assigned to the UE.

Another aspect discloses a method of wireless communication where frequency division multiplexing (FDM) channel information is received, at a user equipment (UE) transmitted in a data region of an extended radio frame or a multiple broadcast multimedia services single frequency network (MBSFN) subframe within the extended radio frame. The extended radio frame has a length of time greater than a time defined for a single radio frame. A PUSCH (physical uplink shared channel) is retransmitted in accordance with the received FDM channel information, and occurs in accordance with hybrid automatic repeat request (HARQ) timing within the extended radio frame.

Another aspect discloses a system for wireless communication having a memory and at least one processor coupled to the memory. The processor(s) is configured to partition subframe groups over an extended radio frame. The extended radio frame has a length of time greater than a time defined for a single radio frame. The processor is configured to suspend PUSCH (physical uplink shared channel) retransmission in the extended radio frame, in accordance with hybrid automatic repeat request (HARQ) timing of a subframe group assigned to the UE.

In another aspect, a system for wireless communication having a memory and at least one processor coupled to the memory is disclosed. The processor(s) is configured to receive frequency division multiplexing (FDM) channel information, at a user equipment (UE), transmitted in a data region of an extended radio frame or a multiple broadcast multimedia services single frequency network (MBSFN) subframe within the extended radio frame. The extended radio frame has a length of time greater than a time defined for a single radio frame. The processor retransmits a PUSCH (physical uplink shared channel) in accordance with the received FDM channel information. The retransmission occurs in accordance with hybrid automatic repeat request (HARQ) timing within the extended radio frame.

In yet another aspect, an apparatus is disclosed. The apparatus includes means for partitioning subframe groups over an extended radio frame, where the extended radio frame has a length of time greater than a time defined for a single radio frame. The apparatus includes a means for suspending, by a user equipment (UE), PUSCH (physical uplink shared channel) retransmission in the extended radio frame, in accordance with hybrid automatic repeat request (HARQ) timing of a subframe group assigned to the UE.

In still another aspect, an apparatus is disclosed. The apparatus includes means for receiving frequency division multiplexing (FDM) channel information, at a user equipment (UE), where the channel information is transmitted in a data region of an extended radio frame or a multiple broadcast multimedia services single frequency network (MBSFN) subframe within the extended radio frame. The extended radio frame has a length of time greater than a time defined for a single radio frame. The apparatus includes a means for retransmitting a PUSCH (physical uplink shared channel) in accordance with the received FDM channel information. The retransmitting means occurs in accordance with hybrid automatic repeat request (HARQ) timing within the extended radio frame.

In another aspect, a computer program product for wireless communications in a wireless network is disclosed. The computer readable medium has program code recorded thereon which, when executed by one or more processors, cause the processor(s) to perform the operation of partitioning subframe groups over an extended radio frame. The extended radio frame has a length of time greater than a time defined for a single radio frame. The program code also causes the processor(s) to suspend, by a user equipment (UE), PUSCH (physical uplink shared channel) retransmission in the extended radio frame, in accordance with hybrid automatic repeat request (HARQ) timing of a subframe group assigned to the UE.

Another aspect discloses a computer program product for wireless communications in a wireless network. The computer readable medium has program code recorded thereon which, when executed by one or more processors, cause the processor(s) to perform the operation of receiving frequency division multiplexing (FDM) channel information, at a user equipment (UE), transmitted in a data region of an extended radio frame or a multiple broadcast multimedia services single frequency network (MBSFN) subframe within the extended radio frame. The extended radio frame has a length of time greater than a time defined for a single radio frame. The program code also causes the processor(s) to retransmit a PUSCH (physical uplink shared channel) in accordance with the received FDM channel information. The retransmission occurs in accordance with hybrid automatic repeat request (HARQ) timing within the extended radio frame.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
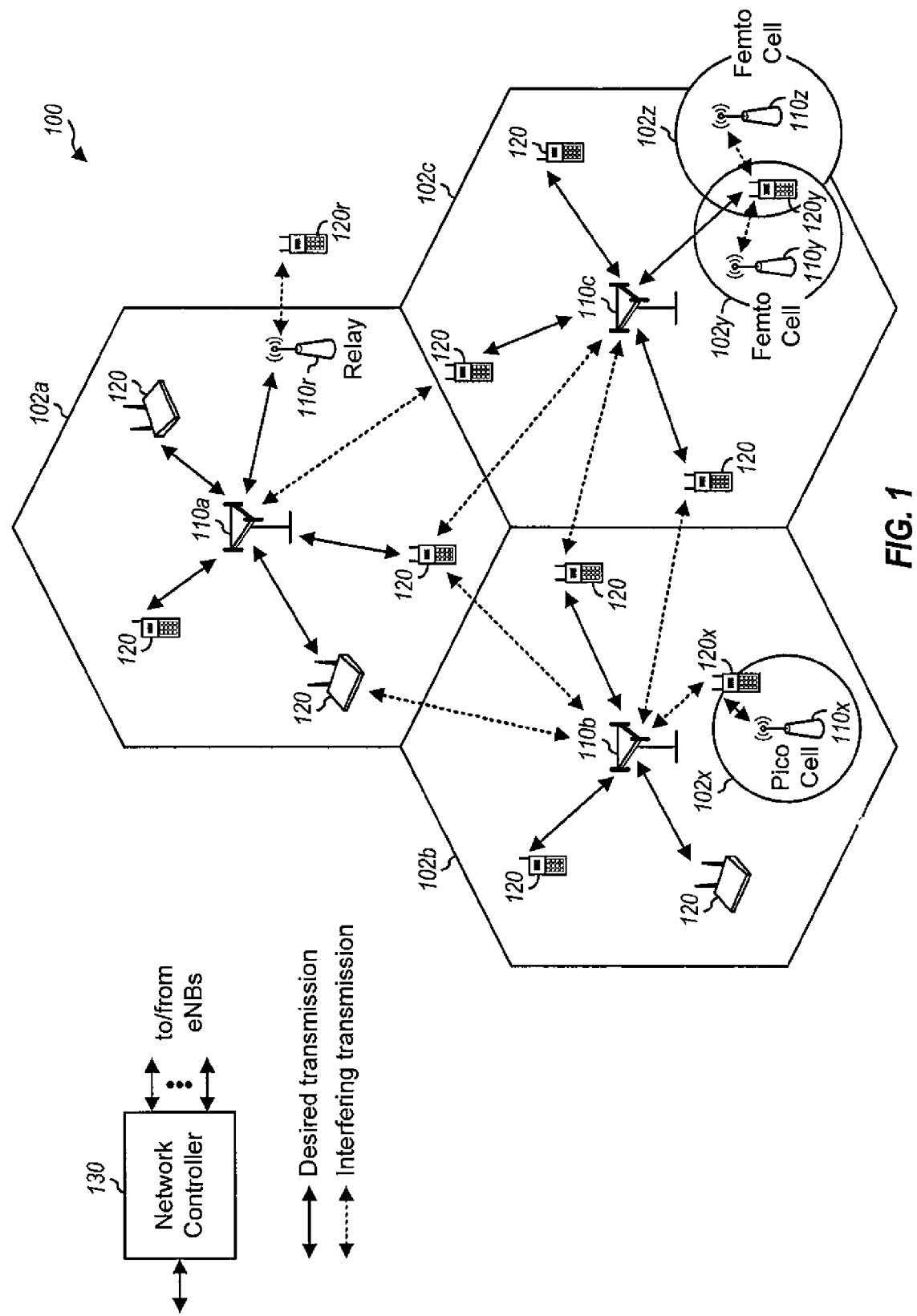
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul 132. The eNodeBs 110 may also communicate with one another, e.g., directly or indirectly via a wireless backhaul 134 or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2:
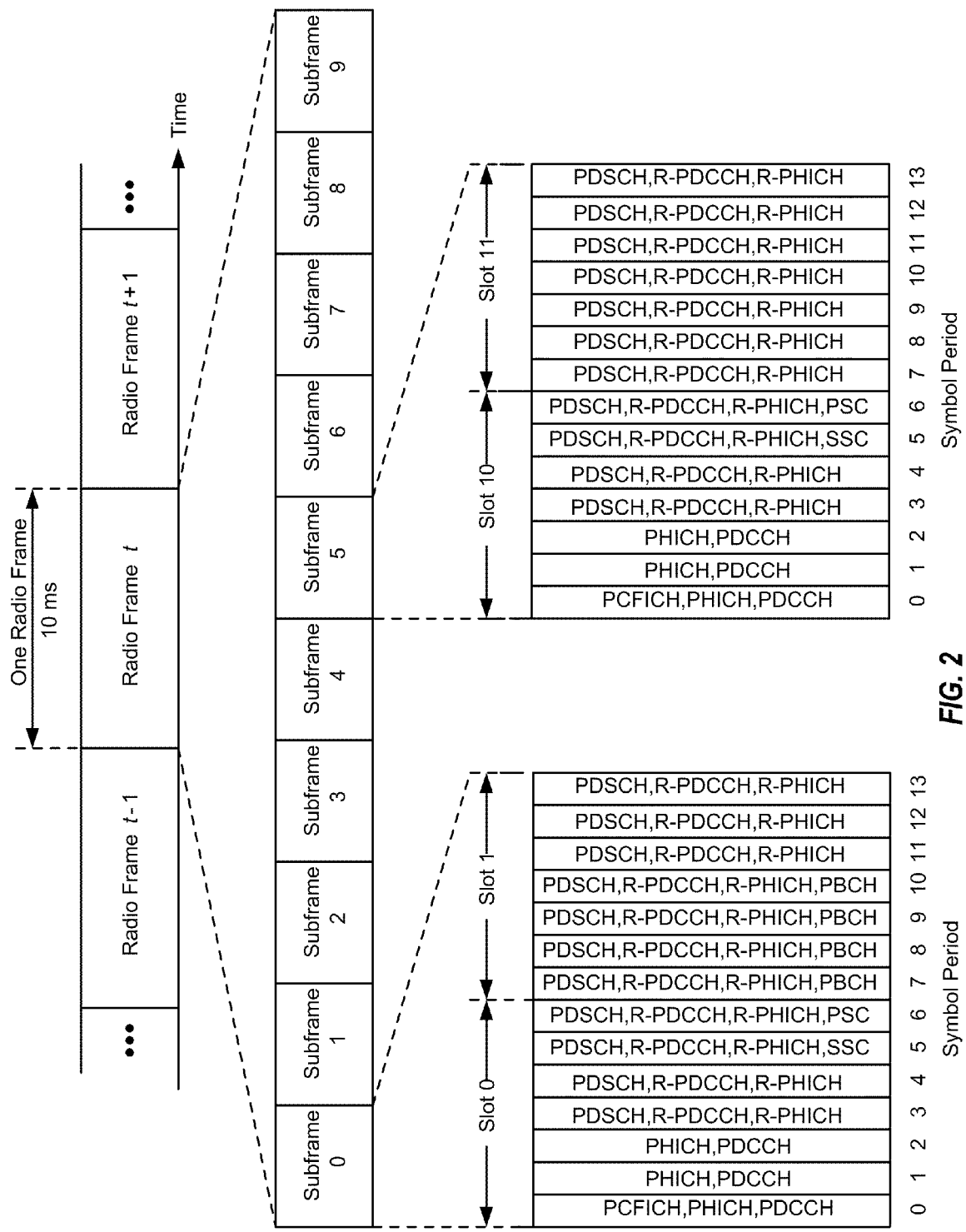
FIG. 2 is a diagram conceptually illustrating an example of a downlink frame structure in a telecommunications system.

FIG. 2 shows a downlink FDD frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
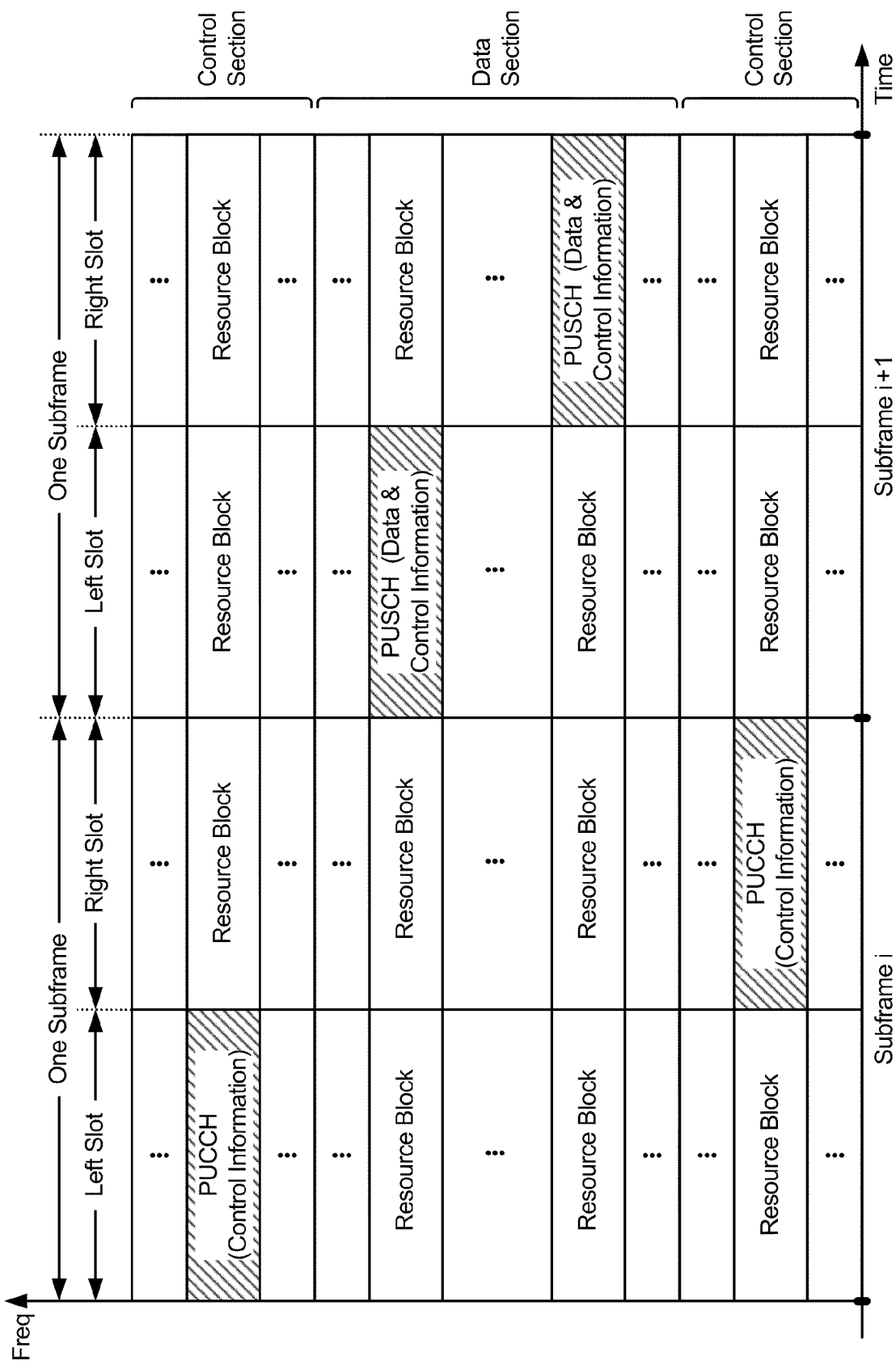
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Conventionally in the time domain of LTE there is a radio frame that is 10 ms long and has 10 subframes of 1 ms each. Every subframe may have two slots where each slot is 0.5 ms. The subcarrier spacing in the frequency domain is 15 kHz. Twelve of these subcarriers together (per slot) is called a resource block so one resource block is 180 kHz. Six resource blocks fit in a carrier of 1.4 MHz, and 100 resource block fit in a carrier of 20 MHz.

Figure 4:
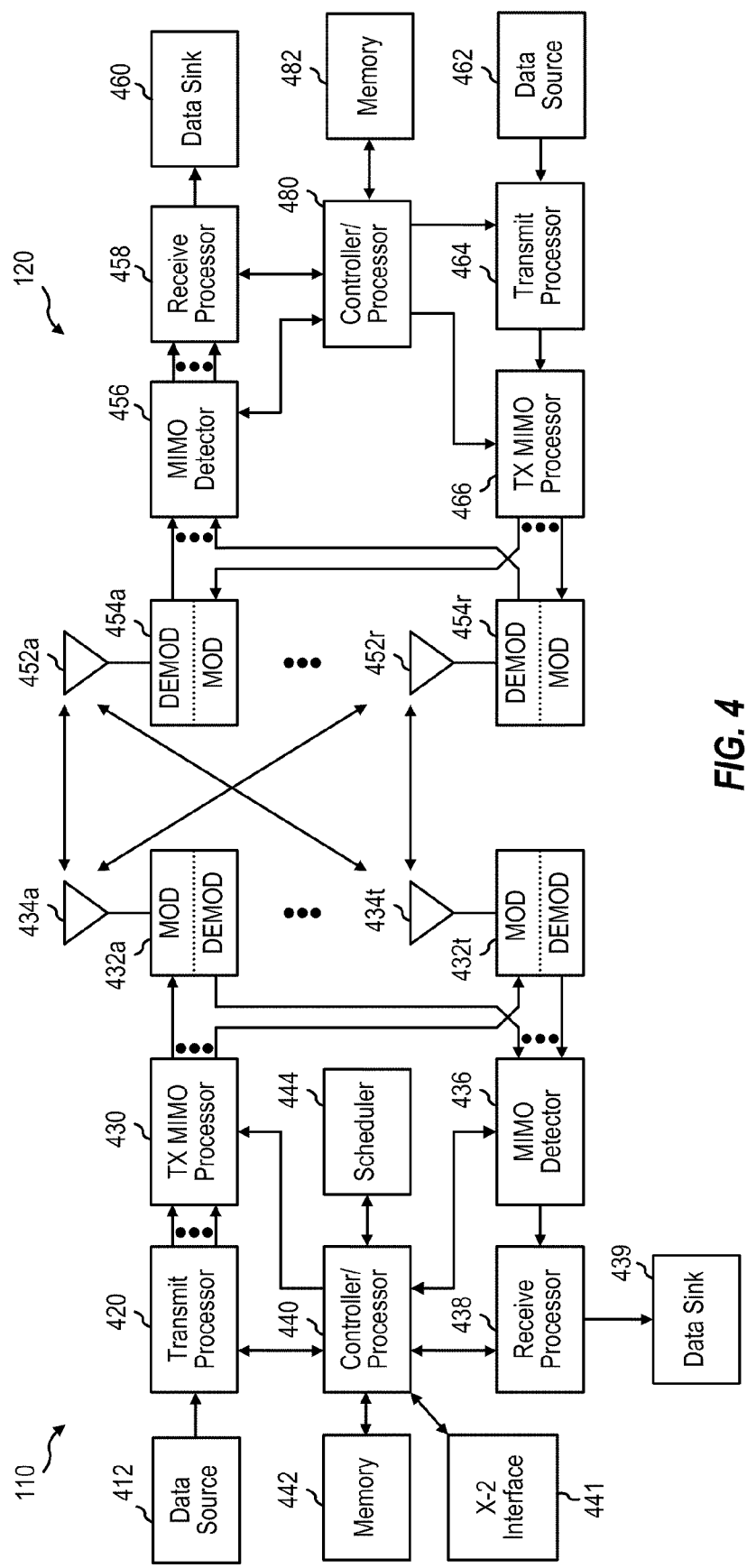
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIGURE, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
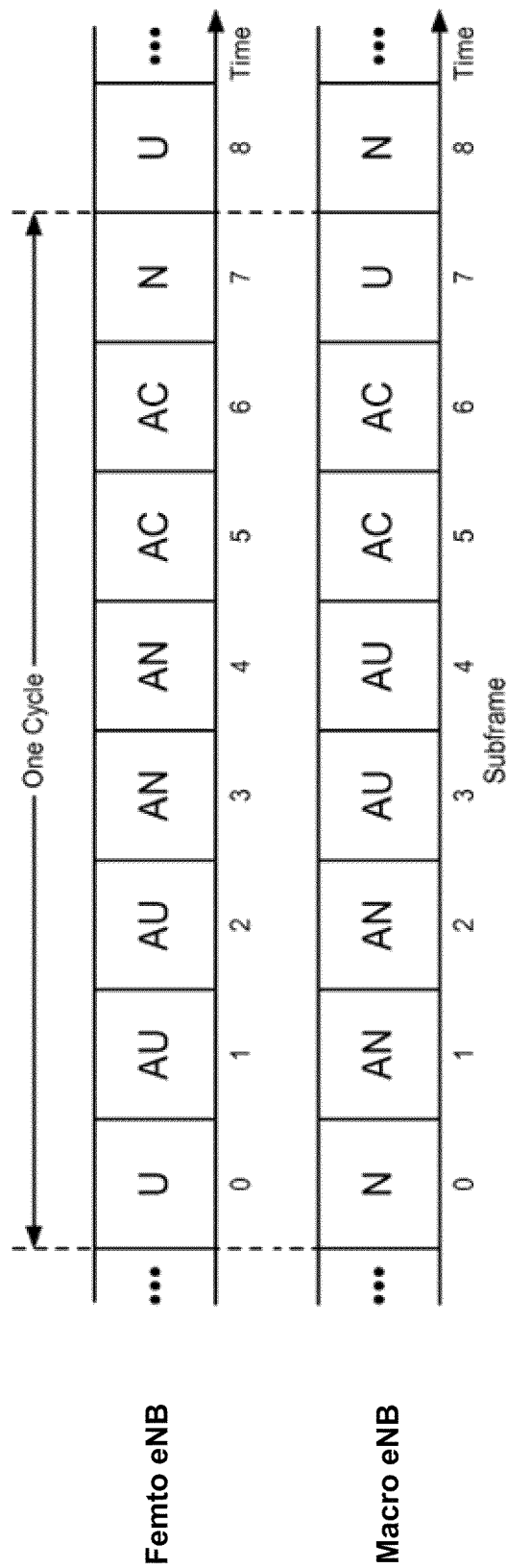
FIG. 5 is a block diagram conceptually illustrating adaptive resource partitioning in a heterogeneous network according to one aspect of the disclosure.

FIG. 5 is a block diagram illustrating TDM partitioning in a heterogeneous network. A first row of blocks illustrate subframe assignments for a femto eNodeB, and a second row of blocks illustrate subframe assignments for a macro eNodeB. Each of the eNodeBs has a static protected subframe during which the other eNodeB has a static prohibited subframe. For example, the femto eNodeB has a protected subframe (U subframe) in subframe 0 corresponding to a prohibited subframe (N subframe) in subframe 0. Likewise, the macro eNodeB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNodeB and the macro eNodeB may transmit data.

Protected subframes (such as U/AU subframes) have reduced interference and a high channel quality because aggressor eNodeBs are prohibited from transmitting. Prohibited subframes (such as N/AN subframes) have no data transmission to allow victim eNodeBs to transmit data with low interference levels. Common subframes (such as C/AC subframes) have a channel quality dependent on the number of neighbor eNodeBs transmitting data. For example, if neighbor eNodeBs are transmitting data on the common subframes, the channel quality of the common subframes may be lower than the protected subframes. Channel quality on common subframes may also be lower for extended boundary area (EBA) UEs strongly affected by aggressor eNodeBs. An EBA UE may belong to a first eNodeB but also be located in the coverage area of a second eNodeB. For example, a UE communicating with a macro eNodeB that is near the range limit of a femto eNodeB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Using coordinated interference management, the eNodeB 110c and the femto eNodeB 110y may communicate over the backhaul 134 to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 μs (5 km÷3×108, i.e., the speed of light, 'c'). Comparing that downlink signal from the macro eNodeB to the downlink signal from a much closer femto eNodeB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

As discussed with reference to FIG. 5, TDD (time division duplex) uplink-downlink configurations may be partitioned in groups according to power classes of the eNodeB to avoid interference between the power classes. The number of partitioned groups that are supported may be limited to the particular implemented uplink-downlink configuration. In particular, the HARQ timeline may not support a desired number of groups. In existing TDD configuration 1, the subframes may be configured into the following four groups based on HARQ timing:

Group 1: 0/1/7 (DL subframe 0 and 1 and UL subframe 7);
Group 2: 5/6/2 (DL subframe 5 and 6 and UL subframe 2);
Group 3: 4/8 (DL subframe 4 and UL subframe 8); and
Group 4: 9/3 (DL subframe 9 and UL subframe 3).

Accordingly, with the above configuration, there are, at most, four groups available for partitioning, due to the designated HARQ timing. In one example, an extended frame structure is employed to enable more partition groups while still satisfying HARQ timing. Rather than sharing groups among eNodeB classes and possibly experiencing interference within the shared groups, enabling more groups can accommodate more classes of eNodeBs with less interference.

Figure 6A:
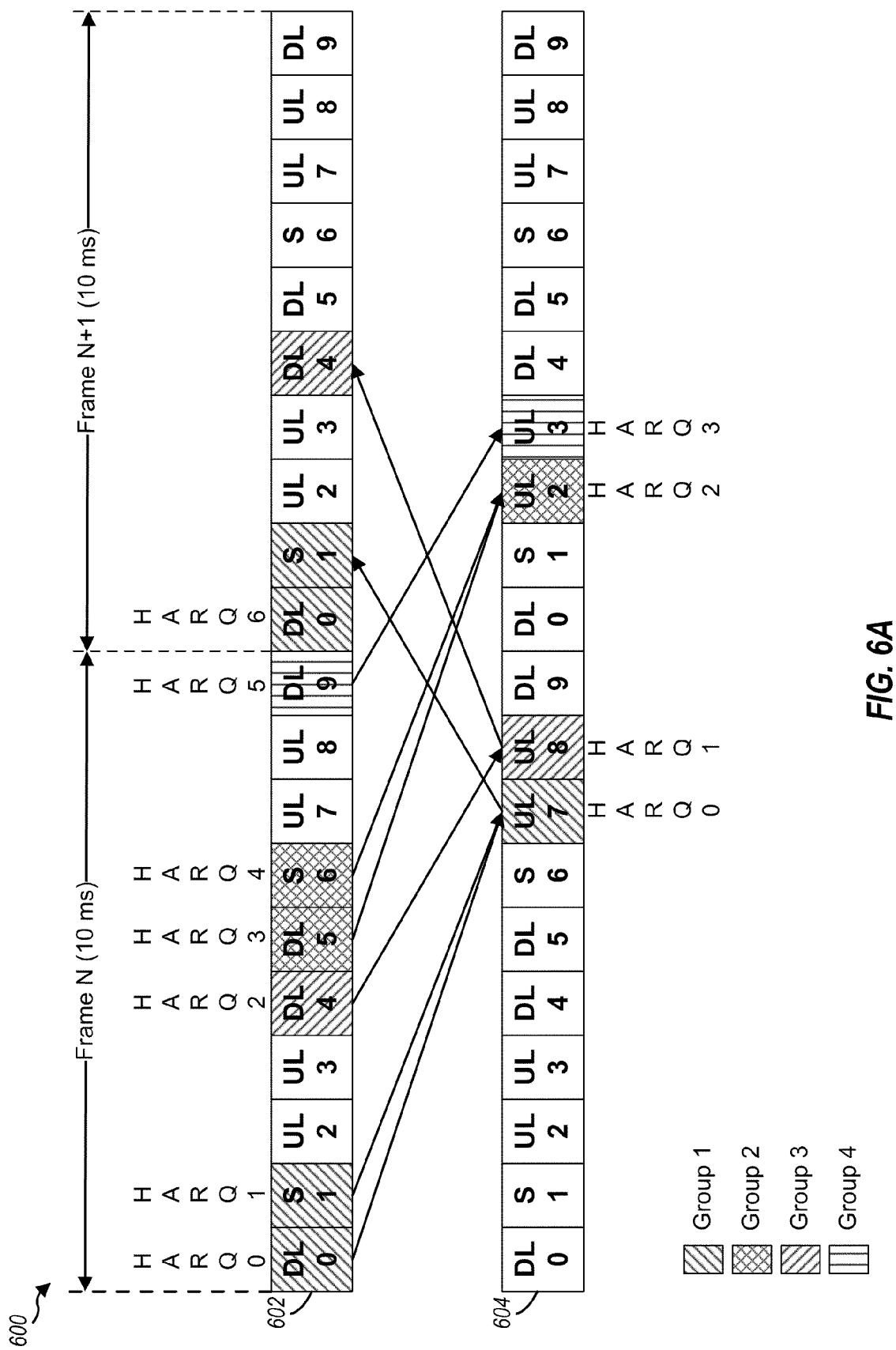
FIG. 6A illustrates an example of the downlink and uplink HARQ processes over an extended frame.

FIG. 6A illustrates an example of the downlink and uplink HARQ processes over an extended subframe structure, i.e., two 10 ms frames, N and N+1. In the example configuration 600 (TDD configuration 1), the eNode B timeline 602, includes seven downlink HARQ processes, identified as HARQ 0-6, in the two 10 ms frames. In the UE timeline 604, four uplink HARQ processes are included over the two 10 ms frames, and are identified as HARQ 0-3. The example TDD configuration includes uplink (UL) subframes, downlink (DL) subframes and special subframes. Subframes 0, 4, 5 and 9 are downlink subframes. Subframes 2, 3 7, and 8 are uplink subframes. Subframes 1 and 6 denote special subframes that include a downlink period, a gap, and an uplink period.

In case more partition groups are desired, the radio frame is extended so the downlink subframe can be partitioned with a longer partition period. For example, in radio frame N: Group 1: 0/1/7; Group 2: 5/6/2; Group 3: 4/8; and Group 4: 9/3 can correspond to the first four partition groups. And in radio frame N+1: Group 5: 0/1/7; Group 6: 5/6/2; Group 7: 4/8; and Group 8: 9/3 can correspond to four additional partition groups. Accordingly, in a 10 ms period in radio frame N, there are four groups. Additionally, radio frame N+1 contains another four groups, thus totaling eight groups. By effectively employing an extended frame over a 20 ms period (N and N+1), additional groups may be supported (e.g., 8 partition groups can be supported instead of only 4 groups).

Figure 6B:
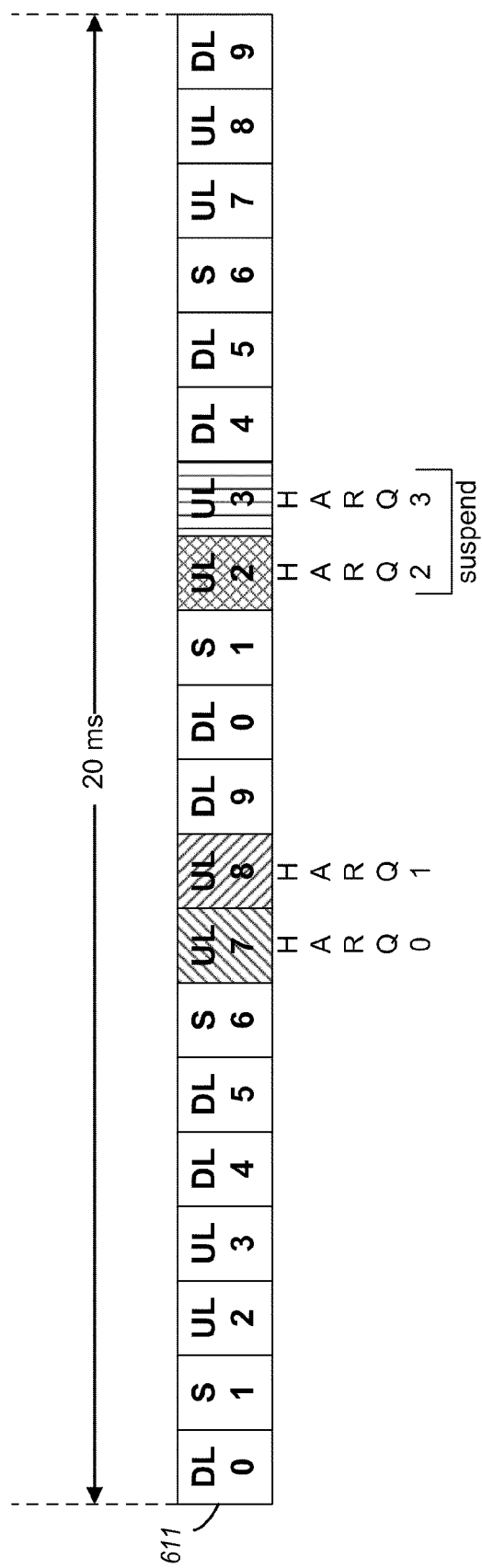
FIG. 6B illustrates an example of an extended uplink frame.

FIG. 6B illustrates an exemplary extended uplink (UL) timeline 611, that effectively sums frames N and N+1 to provide a 20 ms frame. In this exemplary illustration, the uplink HARQ processes for the second half of the extended frame (i.e., for frame N+1) are suspended. Thus, these uplink HARQ processes can be used by another partition group. The uplink HARQ processes may be suspended every other radio frame via a system information block (SIB) configuration, or via acknowledgment (ACK) messages, as discussed further below.

In one example employing the extended radio frame and thereby supporting additional groups (e.g., 8 groups in the above example), an adjustment may be implemented in certain examples of the present disclosure to remain compatible with the Release 8 UL HARQ timeline. For example, the UL HARQ processes can be suspended every other radio frame via the system information block (SIB) configuration. In another example, the UL HARQ is suspended every other radio frame via R-PHICH messages.

In other embodiments, no uplink HARQ suspension is performed. For example, if no uplink HARQ suspension is performed, the uplink HARQ follows R-PDCCH and R-PHICH. R-PHICH and R-PDCCH correspond to PHICH and PDCCH, respectively, but are transmitted in the PDSCH data region or in a multiple broadcast multimedia services single frequency network (MBSFN) type of subframe. Referring back to FIG. 2, the R-PDCCH and R-PHICH are transmitted in the PDSCH data region (in symbol periods 3-13 shown for subframe 0). In certain embodiments, the R-PHICH and R-PDCCH are in FDM (frequency division multiplexing) form, rather than TDM form.

Various exemplary options for extending the frame time (and thus the number of groups supported) while maintaining the Release 8 uplink HARQ timeline are described below. In one example, the uplink HARQ retransmissions (PUSCH) may be suspended every other radio frame via SIB configuration. In particular, an eNodeB may communicate SIB configuration to a group of UEs to instruct the UEs to suspend uplink HARQ retransmission every other radio frame. In other words, the data channel retransmissions (PUSCH) scheduled to be sent in an even radio frame are suspended, and are sent in the following odd radio frame. Similarly, retransmissions scheduled for an odd radio frame are skipped and delayed until the following (even) radio frame. An example of this uplink HARQ suspension is illustrated in FIG. 6B.

In another example, uplink HARQ retransmission (PUSCH) is suspended every other radio frame via downlink acknowledgment (e.g., R-PHICH). For example, an eNodeB may communicate information to a UE in the R-PHICH transmission that instructs the UE to suspend its uplink HARQ transmission every other radio frame. By transmitting an ACK in the R-PHICH, the UE will not retransmit in the next radio frame. Thus, the UE can be instructed to skip radio frames in this manner. Further, when retransmission is appropriate (i.e., whether in the odd or even radio frame) the eNodeB can send a scheduling grant and a NACK to initiate the retransmission at the appropriate time.

R-PHICH can be used instead of PHICH because PHICH could be transmitted within a subframe belonging to another partition group. Because the R-PHICH supports FDM (frequency division multiplexing), different partition groups can be frequency multiplexed within an R-PHICH. Thus, particular groups can receive signaling, even though the R-PHICH is in a subframe designated for another group. Within this example, the R-PHICH is transmitted in accordance with Release 8 timing. An example of this uplink HARQ suspension is illustrated in FIG. 6B.

In another example, no uplink HARQ transmission is suspended. Rather, downlink control information for the uplink HARQ is provided in either R-PDCCH alone, or R-PDCCH and R-PHICH. As mentioned above, R-PDCCH and R-PHICH are the PDCCH and PHICH, respectively, transmitted in the PDSCH data region in one subframe or in the MBSFN type of subframe. The uplink HARQ transmission follows receipt of the downlink control information for the uplink HARQ provided in either the R-PDDCH or the R-PDCCH and R-PHICH. The R-PDCCH and R-PHICH may be used to schedule the data. This allows the PDCCH and PHICH information to be transmitted in an FDM manner (as R-PDCCH and R-PHICH in the PDSCH data region), instead of being transmitted in a TDM manner (as the PDCCH and PHICH are defined in Release 8). This allows for the information contained in the R-PDCCH and R-PHICH to be orthogonalized such that information may be carried for multiple different cells without interfering with each other.

While an example is discussed herein with reference to configuration 1 of TDD, the concepts disclosed herein may likewise be employed for implementing an extended frame and maintaining compatibility with a defined HARQ timeline for non-extended (i.e., originally-defined) frames, such as 10 ms frames in Release 8.

Figure 7:
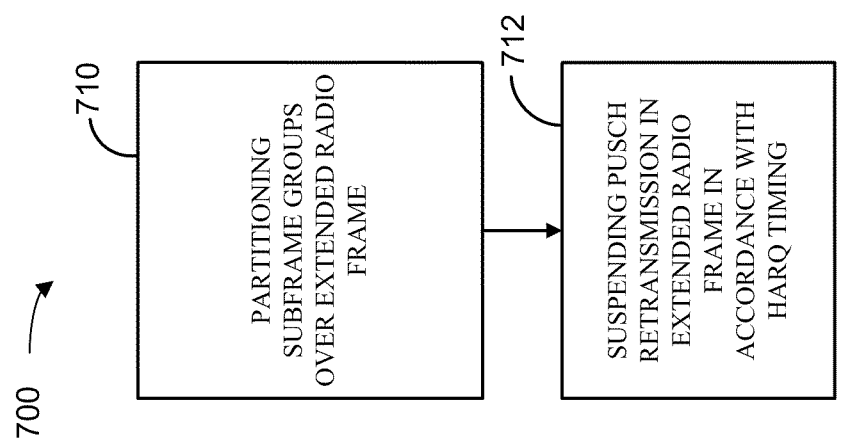
FIG. 7 is a block diagram illustrating a method for maintaining uplink HARQ compatibility with extended radio frames.

FIG. 7 illustrates a method 700 for maintaining uplink HARQ compatibility with extended radio frames. In block 710, a subframe groups are partitioned over extended radio frames. In block 712, PUSCH retransmissions are suspended in the extended radio frame in accordance with HARQ timing of a subframe group assigned to the UE.

In one configuration, the eNodeB 110 (UE 120) is configured for wireless communication including means for partitioning subframe groups over an extended radio frame. In one aspect, the partitioning means may be the scheduler 444 configured to perform the functions recited by the partitioning means. The eNodeB 110 is also configured to include a means for suspending. In one aspect, the suspending means may be the controller/processor 480 configured to perform the functions recited by the suspending means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication comprising:
communicating, by a user equipment (UE), using an extended radio frame, the extended radio frame comprising a first radio frame that supports a first set of uplink-downlink configurations and at least a portion of a second radio frame that supports a second set of uplink-downlink configurations, wherein the first set of uplink-downlink configurations and the second set of uplink-downlink configurations are partitioned into one or more subframe groups; and
suspending, by the UE, PUSCH (physical uplink shared channel) transmission in at least one of the first radio frame or the second radio frame in the extended radio frame, wherein the PUSCH transmission is scheduled in accordance with hybrid automatic repeat request (HARQ) timing of a subframe group assigned to the UE.

2. The method of claim 1 in which the extended radio frame has a length of time of at least a sum total of time defined for two consecutive radio frames.

3. The method of claim 1 in which the suspending comprises suspending the PUSCH transmission in every other consecutive radio frame encompassed by the extended radio frame.

4. The method of claim 1 further comprising receiving instructions at the UE to perform the suspending via system information block (SIB) configuration.

5. The method of claim 1 further comprising receiving instructions at the UE to perform the suspending via downlink acknowledgment information transmitted in at least one data region of the extended radio frame.

6. The method of claim 5 in which the at least one data region comprises a R-PHICH (relay-physical HARQ (hybrid automatic repeat request) indicator channel (PHICH).

7. The method of claim 5 in which the downlink acknowledgment information transmitted in data regions intended for a first subframe group is frequency multiplexed with downlink acknowledgment information intended for a second subframe group.

8. The method of claim 5 in which the at least one data region comprises a R-PDCCH (relay-physical downlink control channel (PDCCH)).

9. The method of claim 1 further comprising receiving instructions at the UE to perform the suspending via downlink acknowledgment information transmitted in MBSFN (multiple broadcast multimedia single frequency network) subframe of the extended radio frame.

10. A method for wireless communication comprising:
communicating, by a user equipment (UE), using an extended radio frame, the extended radio frame comprising a first radio frame that supports a first set of uplink-downlink configurations and at least a portion of a second radio frame that supports a second set of uplink-downlink configurations, wherein the first set of uplink-downlink configurations and the second set of uplink-downlink configurations are partitioned into one or more subframe groups;
receiving frequency division multiplexing (FDM) channel information, at the UE, transmitted in a shared data region of the extended radio frame or a multiple broadcast multimedia services single frequency network (MBSFN) subframe; and
transmitting, by the UE, a PUSCH (physical uplink shared channel) transmission in accordance with the received FDM channel information, the PUSCH transmission occurring in accordance with hybrid automatic repeat request (HARQ) timing within the extended radio frame.

11. The method of claim 10, in which the FDM channel information comprises at least one of a physical HARQ (hybrid automatic repeat request) indicator channel (PHICH) information and physical downlink control channel (PDCCH) information.

12. A system for wireless communication, comprising:
a memory; and
at least one processor coupled to the memory, the at least one processor being configured:
to communicate using an extended radio frame, the extended radio frame comprising a first radio frame that supports a first set of uplink-downlink configurations and at least a portion of a second radio frame that supports a second set of uplink-downlink configurations, wherein the first set of uplink-downlink configurations and the second set of uplink-downlink configurations are partitioned into one or more subframe groups; and
to suspend PUSCH (physical uplink shared channel) transmission in at least one of the first radio frame or the second radio frame in the extended radio frame, wherein PUSCH transmission is scheduled in accordance with hybrid automatic repeat request (HARQ) timing of a subframe group assigned to a user equipment (UE).

13. The system of claim 12 in which the extended radio frame has a length of time of at least a sum total of time defined for two consecutive radio frames.

14. The system of claim 12 in which the at least one processor is further configured to suspend the PUSCH transmission in every other consecutive radio frame encompassed by the extended radio frame.

15. The system of claim 12 in which the at least one processor is further configured to receive receiving instructions at the UE to perform the suspending via system information block (SIB) configuration.

16. The system of claim 12 in which the at least one processor is further configured to receive instructions at the UE to perform the suspending via downlink acknowledgment information transmitted in at least one data region of the extended radio frame.

17. The system of claim 16 in which the at least one data region comprises a R-PHICH (relay-physical HARQ (hybrid automatic repeat request) indicator channel (PHICH).

18. The system of claim 16 in which the downlink acknowledgment information transmitted in data regions intended for a first subframe group is frequency multiplexed with downlink acknowledgment information intended for a second subframe group.

19. The system of claim 16 in which the at least one data region comprises a R-PDCCH (relay-physical downlink control channel (PDCCH)).

20. The system of claim 12 in which the at least one processor is further configured to receive instructions at the UE to suspend via downlink acknowledgment information transmitted in MBSFN (multiple broadcast multimedia single frequency network) subframe of the extended radio frame.

21. A system for wireless communication, comprising:
a memory; and
at least one processor coupled to the memory, the at least one processor being configured:
to communicate using an extended radio frame, the extended radio frame comprising a first radio frame that supports a first set of uplink-downlink configurations and at least a portion of a second radio frame that supports a second set of uplink-downlink configurations, wherein the first set of uplink-downlink configurations and the second set of uplink-downlink configurations are partitioned into one or more subframe groups;
to receive frequency division multiplexing (FDM) channel information, at a user equipment (UE), transmitted in a shared data region of the extended radio frame or a multiple broadcast multimedia services single frequency network (MBSFN) subframe; and
to transmit, by the UE, a PUSCH (physical uplink shared channel) transmission in accordance with the received FDM channel information, the PUSCH transmission occurring in accordance with hybrid automatic repeat request (HARQ) timing within the extended radio frame.

22. The system of claim 21, in which the FDM channel information comprises at least one of a physical HARQ (hybrid automatic repeat request) indicator channel (PHICH) information and physical downlink control channel (PDCCH) information.

23. An apparatus for wireless communication, comprising:
means for communicating, by a user equipment (UE), using an extended radio frame, the extended radio frame comprising a first radio frame that supports a first set of uplink-downlink configurations and at least a portion of a second radio frame that supports a second set of uplink-downlink configurations, wherein the first set of uplink-downlink configurations and the second set of uplink-downlink configurations are partitioned into one or more subframe groups; and
means for suspending, by the UE, PUSCH (physical uplink shared channel) transmission in at least one of the first radio frame or the second radio frame in the extended radio frame, wherein the PUSCH transmission is scheduled in accordance with hybrid automatic repeat request (HARQ) timing of a subframe group assigned to the UE.

24. An apparatus for wireless communication, comprising:
means for communicating, by a user equipment (UE), using an extended radio frame, the extended radio frame comprising a first radio frame that supports a first set of uplink-downlink configurations and at least a portion of a second radio frame that supports a second set of uplink-downlink configurations, wherein the first set of uplink-downlink configurations and the second set of uplink-downlink configurations are partitioned into one or more subframe groups;
means for receiving frequency division multiplexing (FDM) channel information, at the UE, transmitted in a shared data region of the extended radio frame or a multiple broadcast multimedia services single frequency network (MBSFN) subframe; and
means for transmitting, by the UE, a PUSCH (physical uplink shared channel) transmission in accordance with the received FDM channel information, the PUSCH transmission occurring in accordance with hybrid automatic repeat request (HARQ) timing within the extended radio frame.

25. A computer program product for wireless communication in a wireless network, comprising:
a non-transitory computer-readable medium having program code recorded thereon, the program code comprising:
program code to communicate, by a user equipment (UE), using an extended radio frame, the extended radio frame comprising a first radio frame that supports a first set of uplink-downlink configurations and at least a portion of a second radio frame that supports a second set of uplink-downlink configurations, wherein the first set of uplink-downlink configurations and the second set of uplink-downlink configurations are partitioned into one or more subframe groups; and
program code to suspend, by the UE, PUSCH (physical uplink shared channel) transmission in at least one of the first radio frame or the second radio frame in the extended radio frame, wherein the PUSCH transmission is scheduled in accordance with hybrid automatic repeat request (HARQ) timing of a subframe group assigned to the UE.

26. A computer program product for wireless communication in a wireless network, comprising:
a non-transitory computer-readable medium having program code recorded thereon, the program code comprising:
program code to communicate, by a user equipment (UE), using an extended radio frame, the extended radio frame comprising a first radio frame that supports a first set of uplink-downlink configurations and at least a portion of a second radio frame that supports a second set of uplink-downlink configurations, wherein the first set of uplink-downlink configurations and the second set of uplink-downlink configurations are partitioned into one or more subframe groups;
program code to receive frequency division multiplexing (FDM) channel information, at the UE, transmitted in a shared data region of the extended radio frame or a multiple broadcast multimedia services single frequency network (MBSFN) subframe; and
program code to transmit, by the UE, a PUSCH (physical uplink shared channel) transmission in accordance with the received FDM channel information, the PUSCH transmission occurring in accordance with hybrid automatic repeat request (HARQ) timing within the extended radio frame.

* * * * *